US010938586B2

(12) United States Patent
Paul et al.

(10) Patent No.: US 10,938,586 B2
(45) Date of Patent: Mar. 2, 2021

(54) SYSTEMS FOR PEER-TO-PEER KNOWLEDGE SHARING PLATFORM

(71) Applicant: ServiceNow, Inc., Santa Clara, CA (US)

(72) Inventors: Sarup Paul, Pleasanton, CA (US); Umakanth Godavarthy, Hyderabad (IN); Prabhat Mishra, Hyderabad (IN); Paulina Luckiewicz, Santa Clara, CA (US); Avishek Dey, Hyderabad (IN); Vinamra Misra, Lucknow (IN); Mallesh Aggu, Adilabad (IN); Harish Bellamane, San Jose, CA (US); Rampradeep Dodda, San Jose, CA (US); Preethi Chittimalla, Union City, CA (US); Ryan Currier, Cupertino, CA (US)

(73) Assignee: SERVICENOW, INC., Santa Clara, CA (US)

( * ) Notice: Subject to any disclaimer, the term of this patent is extended or adjusted under 35 U.S.C. 154(b) by 113 days.

(21) Appl. No.: 15/644,479

(22) Filed: Jul. 7, 2017

(65) Prior Publication Data
US 2018/0323984 A1     Nov. 8, 2018

(30) Foreign Application Priority Data
May 6, 2017    (IN) .............................. 201711016024

(51) Int. Cl.
*H04L 12/18*     (2006.01)
*H04L 29/08*     (2006.01)
*H04L 29/06*     (2006.01)
*H04L 12/58*     (2006.01)

(52) U.S. Cl.
CPC .......... *H04L 12/1813* (2013.01); *H04L 51/14* (2013.01); *H04L 63/104* (2013.01); *H04L 67/1044* (2013.01); *H04L 67/26* (2013.01); *H04L 67/306* (2013.01); *H04L 51/10* (2013.01)

(58) Field of Classification Search
CPC ... H04L 12/1813; H04L 51/14; H04L 63/104; H04L 67/1044; H04L 67/26; H04L 67/306; H04L 51/10
USPC ....................................................... 709/204
See application file for complete search history.

(56) References Cited

U.S. PATENT DOCUMENTS

| | | |
|---|---|---|
| 6,564,259 B1 | 5/2003 | Baber et al. |
| 6,609,122 B1 | 8/2003 | Ensor |
| 7,028,301 B2 | 4/2006 | Ding |
| 7,062,683 B2 | 6/2006 | Warpenburg |
| 7,131,037 B1 | 10/2006 | LeFaive |

(Continued)

OTHER PUBLICATIONS

Wikipedia, Stack Overflow, retrieved from https://web.archive.org/web/20160417150713/https://en.wikipedia.org/wiki/Stack_Overflow, archived on Apr. 17, 2016 (Year: 2016).*

(Continued)

*Primary Examiner* — Nicholas R Taylor
*Assistant Examiner* — Chong G Kim
(74) *Attorney, Agent, or Firm* — Fletcher Yoder, P.C.

(57) ABSTRACT

A system implements user permissions and user subscriptions with regard to content posted on one or more peer-to-peer knowledge sharing platforms (e.g., Community pages). Permissions are assigned to groups of users, rather than individual users. Permissions are determined by the groups of which the user in question is a member.

18 Claims, 16 Drawing Sheets

(56) References Cited

U.S. PATENT DOCUMENTS

| | | |
|---|---|---|
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,747,705 B1* | 6/2010 | Raja ............... G06Q 10/107 709/201 |
| 7,783,744 B2 | 8/2010 | Garg |
| 7,890,802 B2 | 2/2011 | Gerber |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,595,146 B1 | 11/2013 | Liew |
| 8,674,992 B2 | 3/2014 | Poston |
| 8,689,241 B2 | 4/2014 | Naik |
| 8,739,112 B1* | 5/2014 | Reed ............... G06Q 10/10 717/101 |
| 8,743,121 B2 | 6/2014 | De Peuter |
| 8,769,417 B1* | 7/2014 | Robinson ............ G06F 16/9535 715/751 |
| 8,887,133 B2 | 11/2014 | Behnia |
| 9,239,857 B2 | 1/2016 | Trinon |
| 9,280,610 B2 | 3/2016 | Gruber et al. |
| 9,317,574 B1 | 4/2016 | Brisebois et al. |
| 9,535,737 B2 | 1/2017 | Joy |
| 9,557,969 B2 | 1/2017 | Sharma |
| 9,740,785 B1* | 8/2017 | Robinson ............ G06F 16/9535 |
| 9,792,387 B2 | 10/2017 | George |
| 9,842,218 B1 | 12/2017 | Brisebois et al. |
| 2004/0003352 A1* | 1/2004 | Bargeron ............ G06F 17/24 715/230 |
| 2004/0117234 A1 | 6/2004 | Lindsay-Scott et al. |
| 2005/0075886 A1 | 4/2005 | LeFebvre et al. |
| 2008/0065604 A1* | 3/2008 | Tiu ............... H04L 51/32 |
| 2008/0162482 A1 | 7/2008 | Ahern et al. |
| 2009/0182863 A1* | 7/2009 | O'Sullivan ......... G06F 16/9535 709/224 |
| 2009/0192849 A1* | 7/2009 | Hughes ............... G06F 8/10 705/7.11 |
| 2010/0306317 A1* | 12/2010 | Serr ............... G06Q 10/107 709/205 |
| 2011/0041082 A1* | 2/2011 | Nguyen ............... G06Q 10/10 715/752 |
| 2011/0212430 A1* | 9/2011 | Smithmier ............ G09B 5/06 434/322 |
| 2011/0230229 A1 | 9/2011 | Das et al. |
| 2012/0110087 A1* | 5/2012 | Culver ............... G06Q 10/067 709/205 |
| 2013/0124636 A1* | 5/2013 | Zuckerberg ........... H04L 67/306 709/204 |
| 2013/0325968 A1* | 12/2013 | Bosworth ............... H04L 67/22 709/204 |
| 2013/0332523 A1* | 12/2013 | Luu ............... G06Q 30/0251 709/204 |
| 2014/0081953 A1* | 3/2014 | Ingram ............... G06F 16/248 707/722 |
| 2014/0096062 A1* | 4/2014 | Luu ............... H04L 51/32 715/774 |
| 2014/0280594 A1* | 9/2014 | Everton ............... H04L 51/32 709/204 |
| 2014/0372535 A1* | 12/2014 | Chen ............... G06Q 50/01 709/204 |
| 2015/0006237 A1 | 1/2015 | Beck et al. |
| 2015/0026260 A1 | 1/2015 | Worthley |
| 2015/0033327 A1 | 1/2015 | Naglost et al. |
| 2015/0120646 A1 | 4/2015 | Burge et al. |
| 2016/0132816 A1 | 5/2016 | Lush |
| 2016/0182660 A1 | 6/2016 | Byrne et al. |
| 2016/0202883 A1* | 7/2016 | Everton ............... G06F 3/0482 715/753 |
| 2016/0255170 A1 | 9/2016 | Gargi et al. |
| 2017/0316080 A1 | 11/2017 | Brisebois et al. |
| 2018/0033067 A1 | 2/2018 | Oh et al. |
| 2018/0097764 A1* | 4/2018 | Lutsenko ............... H04L 51/24 |

OTHER PUBLICATIONS

Stackexchange, new feature: real time updates to questions, answers, and inbox, retrieved from https://web.archive.org/web/20160405072440/https://meta.stackexchange.com/questions/125677/new-feature-real-time-updates-to-questions-answers-and-inbox, archived on Apr. 5, 2016 (Year: 2016).*

Extended European Search Report for European Application No. 18165130.8 dated Sep. 24, 2018; 7 pgs.

* cited by examiner

FORUM
CUSTOMER SERVICE

USE THIS PAGE TO CONFIGURE/MODIFY TOPICS, CONTENT TYPES AND USER PERMISSIONS FOR THIS FORUM. MORE INFO

*NAME  CUSTOMER SERVICE

*DESCRIPTION  A FORUM FOR HOSTING ALL CONTENT RELATED TO CUSTOMER SERVICE.

PARENT [　　　] 🔍

IMAGE CLICK TO ADD...

[UPDATE] [DELETE]
RELATED LINKS
COPY PERMISSIONS TO FORUM(S)
DEBUG FORUM PERMISSIONS

— 402

| FORUM TOPICS | CONTENT TYPES(4) | FORUM PERMISSIONS | PERMISSION EXCEPTIONS |

CONTENT TYPES  [NEW]  GO TO [CONTENT TYPE ▾] [SEARCH]   ◁◁ ◁ [1] TO 4 OF 4 ▷ ▷▷

FORUM=CUSTOMER SERVICE

| | CONTENT TYPE | ACTIVE |
|---|---|---|
| ⓘ | VIDEO | TRUE |
| ⓘ | QUESTION | TRUE |
| ⓘ | ANSWER | TRUE |
| ⓘ | BLOG | TRUE |

— 406

ACTIONS ON SELECTED ROWS... ▾   ◁◁ ◁ [1] TO 4 OF 4 ▷ ▷▷

≡ PERMISSION
≡ QUESTION, ANSWER WRITE-VIDEO VIEW.                    ⌵  ⊘ ↹↹ ○○○  [UPDATE] [CLONE] [DELETE]   ←

500

*NAME          | QUESTION, ANSWER-WRITE-VIDEO VIEW. |  — 502

*DESCRIPTION   | USERS WITH THIS ACCESS SHOULD BE ABLE TO POST QUESTIONS, WRITE
                 ANSWERS AND VIEW VIDEOS. | — 504

①
[UPDATE] [CLONE] [DELETE]

RELATED LINKS
CLONE
                    506

| FORUM ACCESS | CONTENT TYPE ACCESS | CONTENT TYPES ACCESS(3) | [NEW] SEARCH [FOR TEXT ▽] SEARCH | FORUMS | PERMISSION EXCEPTIONS |

②

≡ CONTENT TYPE ACCESS  ⌕                                                                  ▽▽ ▽ [1] TO 3 OF 3 ▷ ▷▷   ▣
▷ ⚙ ≡ PERMISSION DETAILS
☐  ⓘ  ≡ CONTENT TYPE     ≡ ACTIVE           ≡ CREATED
☐  ⓘ   VIDEO             CONTENT READ        2017-03-22 15:26:59
☐  ⓘ   QUESTION          CONTENT WRITE       2017-03-22 15:26:35
☐  ⓘ   ANSWER            CONTENT WRITE       2017-03-22 15:26:23
                                    508
☐ ACTIONS ON SELECTED ROWS... ▽                                                          ▽▽ ▽ [1] TO 3 OF 3 ▷ ▷▷

FIG. 10

— FORUM
= CUSTOMER SERVICE                                    ⟋ ⁝↕  … UPDATE  DELETE  →

USE THIS PAGE TO CONFIGURE/MODIFY TOPICS, CONTENT
TYPES AND USER PERMISSIONS FOR THIS FORUM. MORE INFO

*NAME        CUSTOMER SERVICE                   — 352   PARENT  [     ] 🔍

*DESCRIPTION  A FORUM FOR HOSTING ALL CONTENT   — 354   IMAGE CLICK TO ADD...
              RELATED TO CUSTOMER SERVICE.

UPDATE  DELETE
RELATED LINKS
COPY PERMISSIONS TO FORUM(S)
DEBUG FORUM PERMISSIONS

FORUM TOPICS | CONTENT TYPES(4) | FORUM PERMISSIONS(2) | PERMISSION EXCEPTIONS ⎤— 556

☰ PERMISSION EXCEPTIONS  NEW    GO TO  USER ▾  SEARCH                    ⊟

▷ FORUM=CUSTOMER SERVICE
⚙
🔍     = USER                                          = PERMISSION
ⓘ
☐      BILLIE COWLEY                                   FORUM MODERATOR
                                             — 602

COPY PERMISSIONS
CUSTOMER SERVICE

ENTER FORUM(S) THAT YOU WOULD LIKE TO COPY PERMISSIONS TO.
COPIED PERMISSIONS ARE APPENDED TO SELECTED FORUMS AND WILL NOT ADD DUPLICATED PERMISSIONS.

| COPY PERMISSIONS FROM | CUSTOMER SERVICE | | SOURCE FORUM |

652

| *APPLY PERMISSIONS TO | ASSET MANAGEMENT X | CHANGE AND RELEASE MANAGEMENT X | SELECT TARGET FORUMS |

654

- CASE MANAGEMENT
- CMS
- CUSTOMER SERVICE MANAGEMENT
- DEVELOPER COMMUNITY
- FORUM 1
- FORUM 2
- FORUM 3
- FORUM 4

SUBMIT

SUBMIT

SYSTEMS FOR PEER-TO-PEER KNOWLEDGE SHARING PLATFORM

CROSS-REFERENCE TO RELATED APPLICATION

This application claims priority to and the benefit of Indian Patent Application No. 201711016024, entitled "SYSTEMS FOR PEER-TO-PEER KNOWLEDGE SHARING PLATFORM", filed May 6, 2017, which is herein incorporated by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Individuals, enterprises, and other organizations may utilize software resources to conduct activities or otherwise run an organization. Even well designed software resources may take an average user weeks or months of regular use to feel comfortable using. To address this issue, providers of software resources may allocate significant resources toward customer service and customer training, assisting customers in using the software resources. Similarly, time spent by customers learning how to use the software resources may reduce efficiency and prevent the user from completing other tasks.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed techniques generally relate to keeping track of and implementing user permissions and user subscriptions with regard to content posted on one or more peer-to-peer knowledge sharing platforms (e.g., Community pages). Specifically, by assigning permissions to groups of users, rather than individual users, and then keeping track of which users belong to what groups, setting up and maintaining user permissions for various content types is easier, and requires less memory and less processing power. If a user belongs to multiple groups, permissions may be determined by ranking the groups and giving the user in question the permissions of one group based on the ranking, or by granting the user the most permissible set of permissions, either for all content types, or by individual content types. Further, within the Community pages, users may subscribe to forums, topics, user profiles, pages, specific content, or any other object. Users may then define preferences for how they would like to be notified of activity. Based on the notification preferences, the user may be notified of activity via an activity stream when they log into the Community pages, via email, via SMS message, via push notification, or some other way.

BRIEF DESCRIPTION OF THE DRAWINGS

The description herein makes reference to the accompanying drawings, wherein like reference numerals refer to like parts throughout the several views.

FIG. 5 is a screen that allows an operator to edit an existing forum or name a new forum within the Community pages, in accordance with an embodiment;

FIG. 6 is a screen that allows the operator to select the types of content facilitated by the forum, in accordance with an embodiment;

FIG. 7 is a screen that allows the operator to designate forum user groups, in accordance with an embodiment;

FIG. 8 is a screen that allows the operator to designate permissions for a group by content type by setting up a set of content type permissions, in accordance with an embodiment;

FIG. 10 is a screen that allows permission exceptions to be granted to users or groups of users, in accordance with an embodiment;

FIG. 11 is a screen that allows the operator to bulk copy permissions from the forum to one or more other forums, in accordance with an embodiment;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) is increasingly important in an electronics-driven world in which enterprises and other organizations utilize computers to conduct operations and help run their organizations. However, software resources used by organizations may take a significant time investment for users to learn to operate. This results in reduced efficiency for software resource customers as users learn how to use the software instead of performing their usual tasks. Further, providers of software resources may invest significant resources to customer training and customer service to help guide their customers through using the provided software resources. A peer-to-peer knowledge sharing platform (e.g., "Community pages") provides forums and other pages for users of software resources to post and interact with content (e.g., forums, questions and answers, blogs, videos, polls, events, etc.) regarding use of the software resource. Accordingly, users of a software resource may interact with one another via such pages to learn how to best utilize the software resource, thereby reducing redundancies in training, trouble shooting, and customer service.

Figure 1:
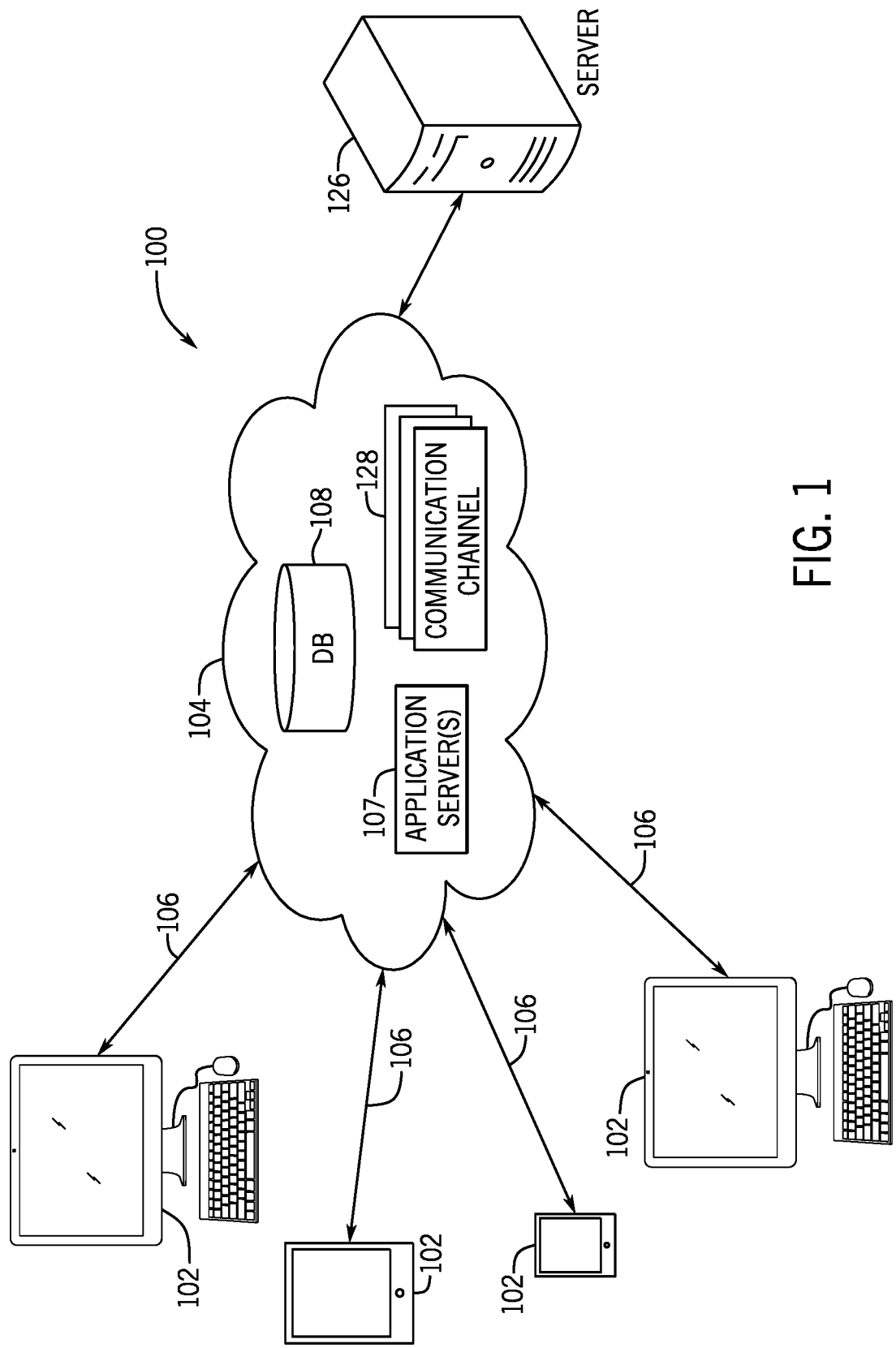
FIG. 1 is a block diagram of a distributed computing system utilizing a platform and a database (DB), in accordance with an embodiment.

With the preceding in mind, FIG. 1 is a block diagram of a system 100 that utilizes distributed computing and that may be used in conjunction with the approaches discussed herein. As illustrated, one or more clients 102 communicate with a platform (e.g., a cloud service) 104 over a communication channel 106. Each client 102 may include any suitable computing system. For instance, the client 102 may include one or more computing devices, such as a mobile phone, a tablet computer, a laptop computer, a notebook computer, a desktop computer, or any other suitable computing device or combination of computing devices. Each client 102 may include client application programs running on the computing devices. Each client 102 can be implemented using a single physical unit or a combination of physical units (e.g., distributed computing) running one or more client application programs. Furthermore, in some embodiments, a single physical unit (e.g., server) may run multiple client application programs simultaneously.

The platform (e.g., cloud service) 104 may include any suitable number of computing devices (e.g., computers) in one or more locations that are connected together using one or more networks. For instance, the platform 104 may include various computers acting as servers in datacenters at one or more geographic locations where the computers are connected together using network and/or Internet connections. The communication channel 106 may include any suitable communication mechanism for electronic communication between each client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the cloud service 104. Additionally or alternatively, the communication channel 106 may include network connection sections when the client and the cloud service 104 are on different networks or entirely using network connections when the client 102 and the cloud service 104 share a common network. Although only four clients 102 are shown connected to the platform 104 in the depicted example, it should be noted that platform 104 may connect to any number of clients (e.g., tens, hundreds, or thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or a database (DB) 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from a database and/or a database server (e.g., the DB 108). For example, the DB 108 may store tables of information (e.g., content, content types, user permissions, user profile data, user subscription data, notification preferences, etc.).

The DB 108 includes a series of tables containing information about assets and services controlled by a client 102 and the configurations of these assets and services. The assets and services may include records of computers, other devices on a network (or group of networks), software contracts and/or licenses, enterprise services; hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; and/or storage constructs such as data files, data directories, or storage models.

Additional to or in place of the DB 108, the platform 104 may include one or more other database servers. The database servers are configured to store, manage, or otherwise provide data for delivering services to the client 102 over the communication channel 106. The database server includes one or more databases (e.g., DB 108) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (DB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely.

Access to the platform 104 is enabled via a server 126 via a communication channel 128. The server 126 may include an application program (e.g., Java application) that runs as a service (e.g., Windows service or UNIX daemon) that facilitates communication and movement of data between the platform 104 and external applications, data sources, and/or services. The server 126 may be implemented using a computing device (e.g., server or computer) on the network 112 that communicates with the platform 104.

The communication channel 128 may be a database table that is typically queried, updated, and inserted into by other systems. In such an implementation, each record in the communication channel 128 is a message from an instance in the platform 104 to a system (e.g., server 126) external to the platform 104 that connects to the platform 104 or a specific instance running in the platform 104 or a message to the instance from the external system. The fields of a communication channel 128 record include various data about the external system or the message in the record.

The application servers 107 may store content accessible by one or more users via one of the clients. For example, the application server 107 may store one or more pages (e.g., Community pages and/or forums as discussed herein) with which one or more of the users may interact (e.g., view, post, etc.). As a result, users may use the pages to communicate with one another, for example, to share strategies of how best to implement and utilize tools available via the application servers 107.

As discussed herein, different users may have different permissions for how they interact with the pages. For example, developers and managers may have permission to interact with posted content in different ways. Some clients may have read and write authority (e.g., post content and see content posted by others), while others may have read only authority (e.g., see content, but cannot post). A third group of users may not be able to see the content at all. Permissions may also vary between types of content (e.g., question, blog, video, reply). By assigning users to groups and then assigning permissions to groups of users, it may be easier and more efficient to keep track of user permissions for large numbers of users.

The system 100 may also enable users to manage their profiles and subscribe to various content on the pages. For example, users may subscribe to another user, a page, a post, a comment thread, etc. Users may also specify how they wish to be made aware of new content or changes to the content to which they are subscribed. For example, new content, or changes to content may be show up on an activity feed when a user logs into the Community pages. However, the user may also set subscription settings to get emails, SMS text messages, push notifications, etc. when subscribed to content changes.

Figure 2:
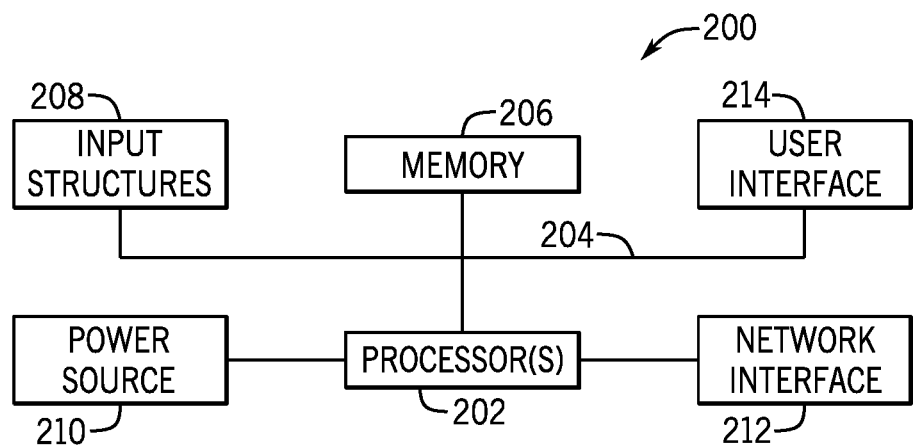
FIG. 2 is a block diagram of a computing device utilized in the distributed computing system of FIG. 1, in accordance with an embodiment.

FIG. 2 generally illustrates a block diagram of an embodiment of an internal configuration of a computing device 200, such as a computing device suitable for accessing and managing access of Community pages as discussed herein. With respect to FIGS. 1 and 2, the computing device 200 may be an embodiment of the client 102, the application server 107, a database server (e.g., DB 108), other servers in the platform 104 (e.g., server hosting the communication channel 128), and/or a device running the server 126. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include a processor capable of performing instructions stored in the memory 206. For example, the one or more processors may include microprocessors, system on a chips (SoCs), or any other circuitry capable of performing functions by executing instructions, such as instructions stored in the memory 206. Additionally or alternatively, the one or more processors 202 may include application-specific integrated circuits (ASICs), field-programmable gate arrays (FPGAs), and/or other devices that may perform the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, haptic feedback, and the like.

Figure 3:
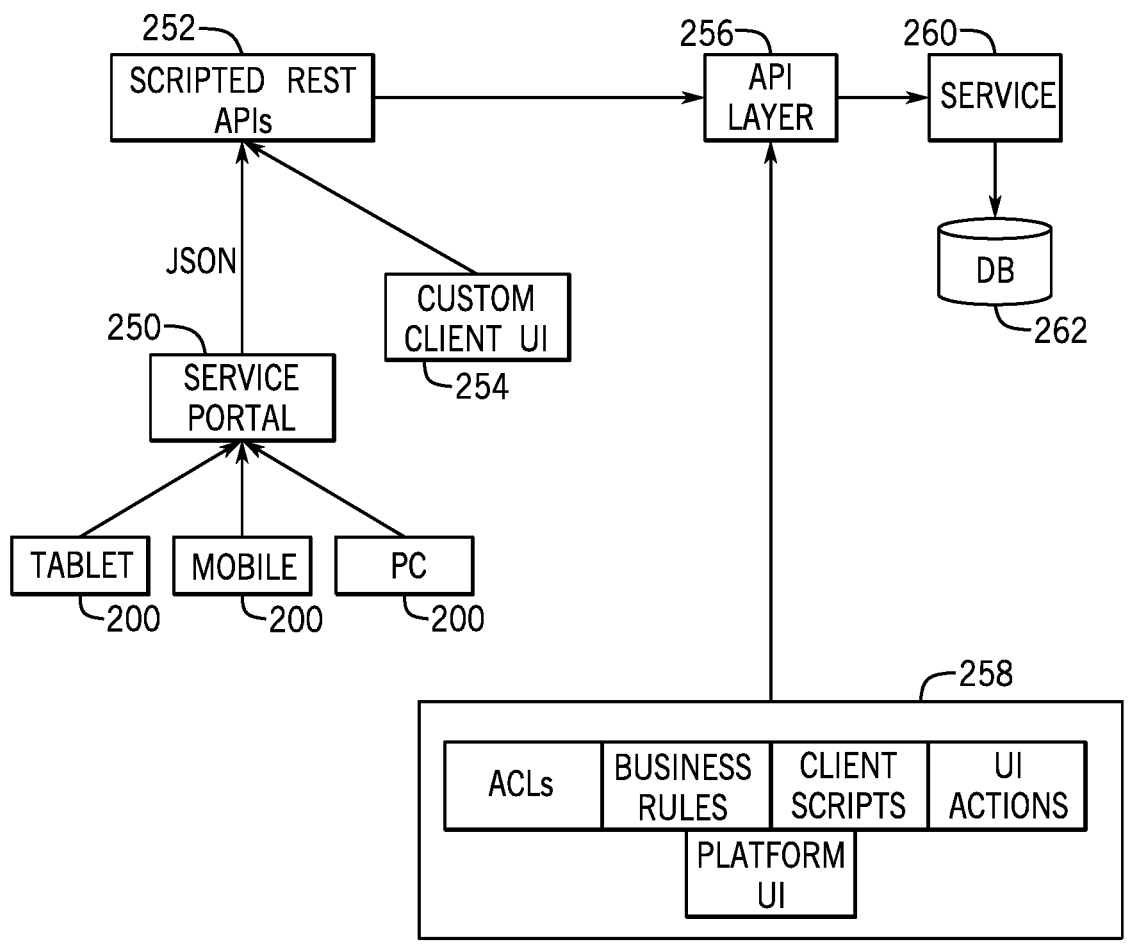
FIG. 3 is a schematic of implementation architecture for one of more Community pages, accessible by the computing device of FIG. 2, in accordance with an embodiment.

A user may use the computing device 200 to access the peer-to-peer knowledge sharing platform (e.g., Community pages) discussed herein and to interact with content on the Community pages. FIG. 3 is a schematic of the Community pages implementation architecture. As shown, a service portal 250 may be accessible by one or more computing devices 200. The service portal 250 may communicate with one or more scripted representational state transfer (REST) application programming interfaces (APIs) 252. The scripted REST APIs 252 may be access control list (ACL) driven and include versioning. In some embodiments, the service portal 250 and the scripted REST APIs 252 may interact with one another via JavaScript Object Notation (JSON), or some other format. For some customers, a custom client user interface 254 may be used to communicate with the scripted REST APIs 252 instead of, or in addition to, the service portal 250. In one implementation, the service portal 250 and custom client user interface 254 needs are driven primarily through the scripted REST APIs 252.

Figure 4:
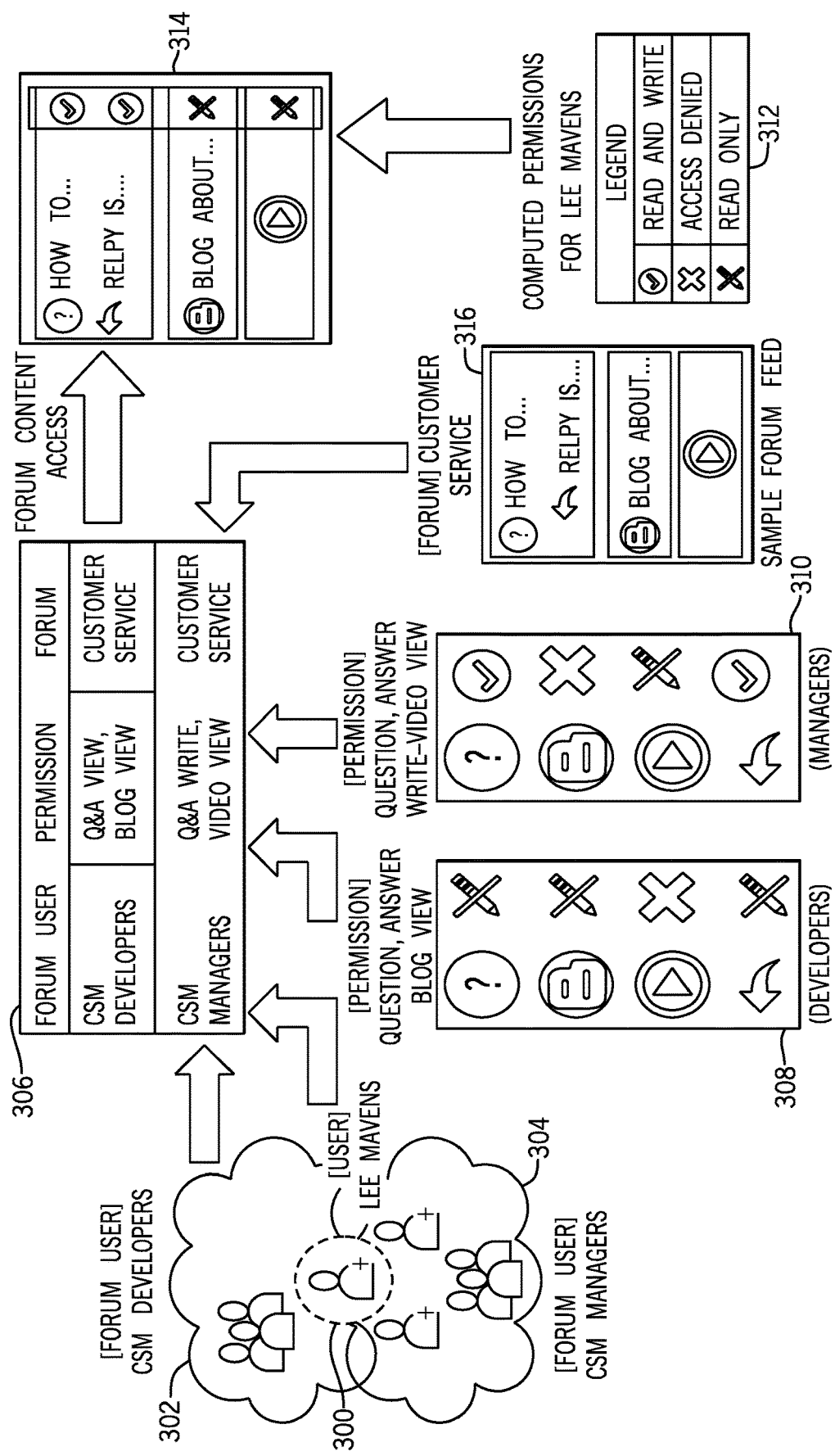
FIG. 4 is a schematic of a permission structure for a hypothetical user of the Community pages, in accordance with an embodiment.

The scripted REST APIs 252 communicate with the API layer 256. The API layer 256 may interact with (e.g., retrieve, remove, replace, store) data, such as ACLs, rules, client scripts, user interface actions, platform user interfaces, and so forth. Platform scripting hooks (such as the ACLs, rules, client scripts, etc.) delegate the logic implementations through the API layer 256. The API layer 256 may also interact with a services layer 260, which may access one or more databases 262. The database shown in FIG. 3 may be the DB 108 shown in FIG. 1, or a different database. The architecture shown in FIG. 3 allows for users to access Community pages by using a computing device 200 to log into the service portal 250. The layered architecture shown in FIG. 3 allows for API customization, enabling structured customer customizations. As previously described, permissions to interact with content on the Community pages may vary from user to user dependent upon the groups of which the user is a member. FIG. 4 illustrates a permission structure for a hypothetical user 300, here "Lee Mavens". As shown, user 300 belongs to the CSM Developers group 302 and the CSM managers group 304.

The permissions for the developers group 302 are listed in table 306 and shown in window 308. The permissions for the managers group 304 are listed in table 306 and shown in window 310. The various permission options (e.g., read and write, read only, and access denied) are shown in legend 312. It should be understood, however that other permission options may be available. As shown, members of the developer group 302 have permission to view questions, blogs, and answers in the customer service forum. Members of the developer group 302 do not have permission to see videos, and do not have permission to write any of the four types of content in the customer service forum. As shown, members of the manager group 304 have permission to read and write questions, read and write answers, and view videos in the customer service forum. Members of the managers group 304 do not have permission to see blogs in the customer service forum. Though four types of content are shown (i.e., questions, blogs, videos, answers), it should be understood that these content types are merely examples and that embodiments with other types of content (e.g., polls, pictures, events, links, etc.) are also envisaged.

The permissions for user 300 are determined based on the permissions of the groups to which he belongs (i.e., CSM Developers 302 and CSM Managers 304) and shown in window 314. If user 300 were a member of only one group, the user's permissions would match the permissions for that group. However, because user 300 is a member of two groups, some additional determinations are made to determine his permissions. As shown, for each content type (i.e., questions, answers, blogs, videos), the more permissive permission of the two groups is chosen for each content type. Note that in this example, the permissions ranked in order from least permissive to most permissive are: access denied, read only, read and write. For example, for questions, members of the developer group 302 can read and members of the manager group 304 can read and write. Because user 300 in this example is a member of both groups, he is granted the most permissive permission and is allowed to read and write. For answers, members of the developer group 302 can read and members of the manager group 304 can read and write, so user 300 in this example is allowed to read and write. For blogs, members of the developer group 302 can read and members of the manager group 304 are denied access, so user 300 is allowed to read only. For videos, members of the developer group 302 are denied access and members of the manager group 304 can view only, so user 300 is allowed to view videos, but not post videos.

Though in the instant example, the user's permissions are determined for each content type. It should be understood that other techniques may be used to determine permissions for users that belong to multiple groups. For example, in some embodiments, groups may be ranked in a specified order (e.g., seniority). The user may then be assigned the permissions of the higher priority group. A sample forum feed based on the user's determined permissions is shown in window 316.

Figure 5:
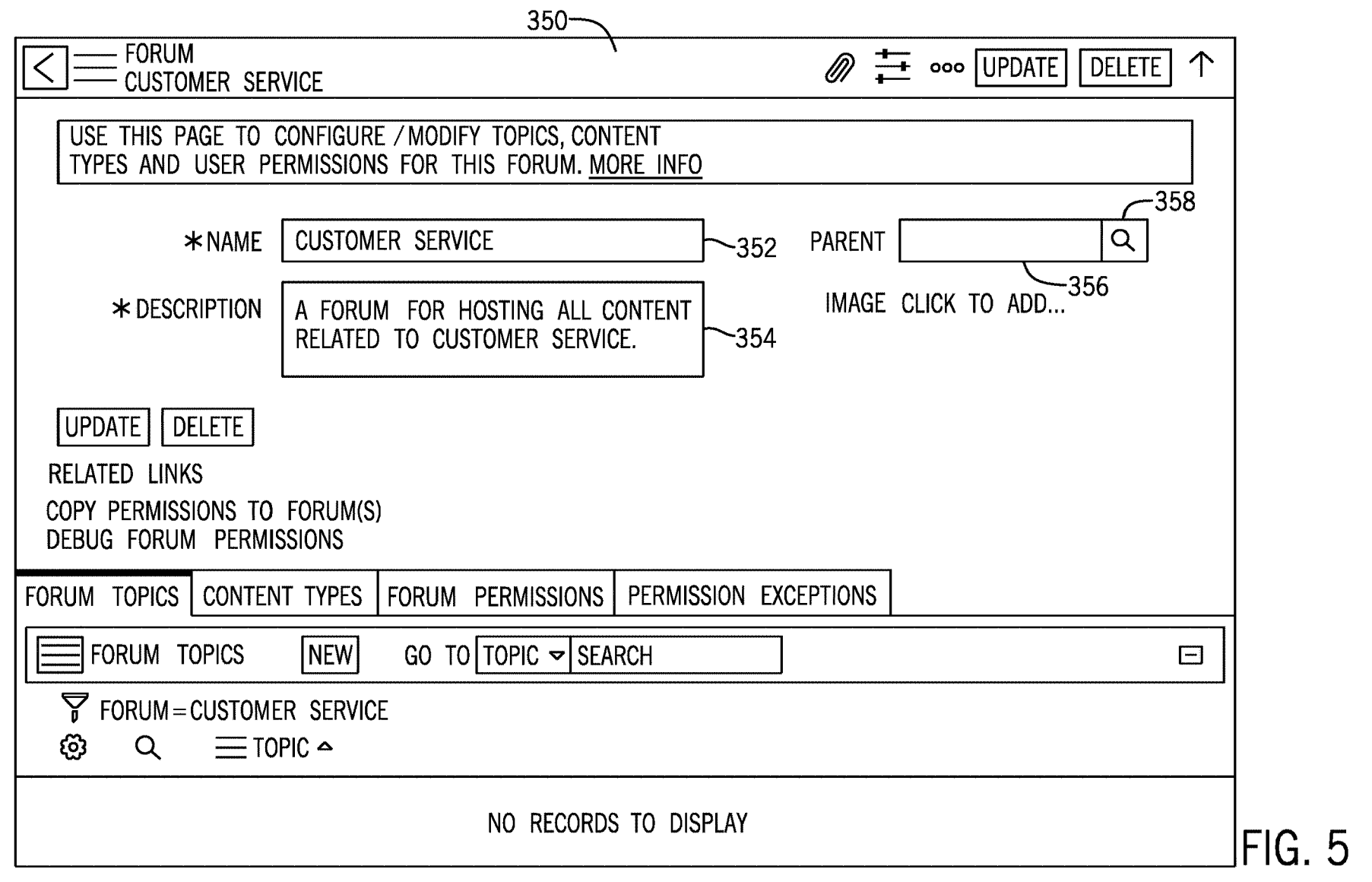

FIGS. 5-12 show various sample screens an operator may see while creating a new forum and setting permissions for the new forum. FIG. 5 is an embodiment of a screen 350 that allows the operator to edit an existing forum or name a new forum. In the name field 352, the operator may edit the name of an existing forum or name a new forum. Though the name shown in FIG. 5 is "customer service" the name may be any name the operator chooses. Similarly, description field 354 may display any text entered by the operator that describes the content of the forum. In some cases, the forum name may be sufficiently descriptive that the description field 354 may be left blank. As shown, the operator may choose to add (e.g., upload or link) an image (e.g., avatar) to be displayed with the forum. The user may also designate a parent forum in the parent field 356. By typing text into the parent field 356 and then selecting the search icon 358, the system may search existing forums and display results that match or are similar to text entered by the operator. If a parent forum is designated, then the new forum will be shown as a subforum of the parent forum. Accordingly, the subject matter of the new forum may be more specific than the parent forum.

FIG. 6 is an embodiment of a screen 400 that allows the operator to select the types of content facilitated by the forum. By selecting the content types tab 402, the operator may edit the types of content facilitated by the forum. The operator may then select the "new" button 404 to add a content type to the forum. The existing content types are listed in window 406. In the instant embodiment, all of the previously discussed content types (i.e., question, answer, blog, and video) are active on the forum, as indicated by the word "true" next to each content type. In order to edit the content types facilitated by the forum, the operator may select one or more of the check boxes 408 and then turn the selected content types on or off.

Figure 7:
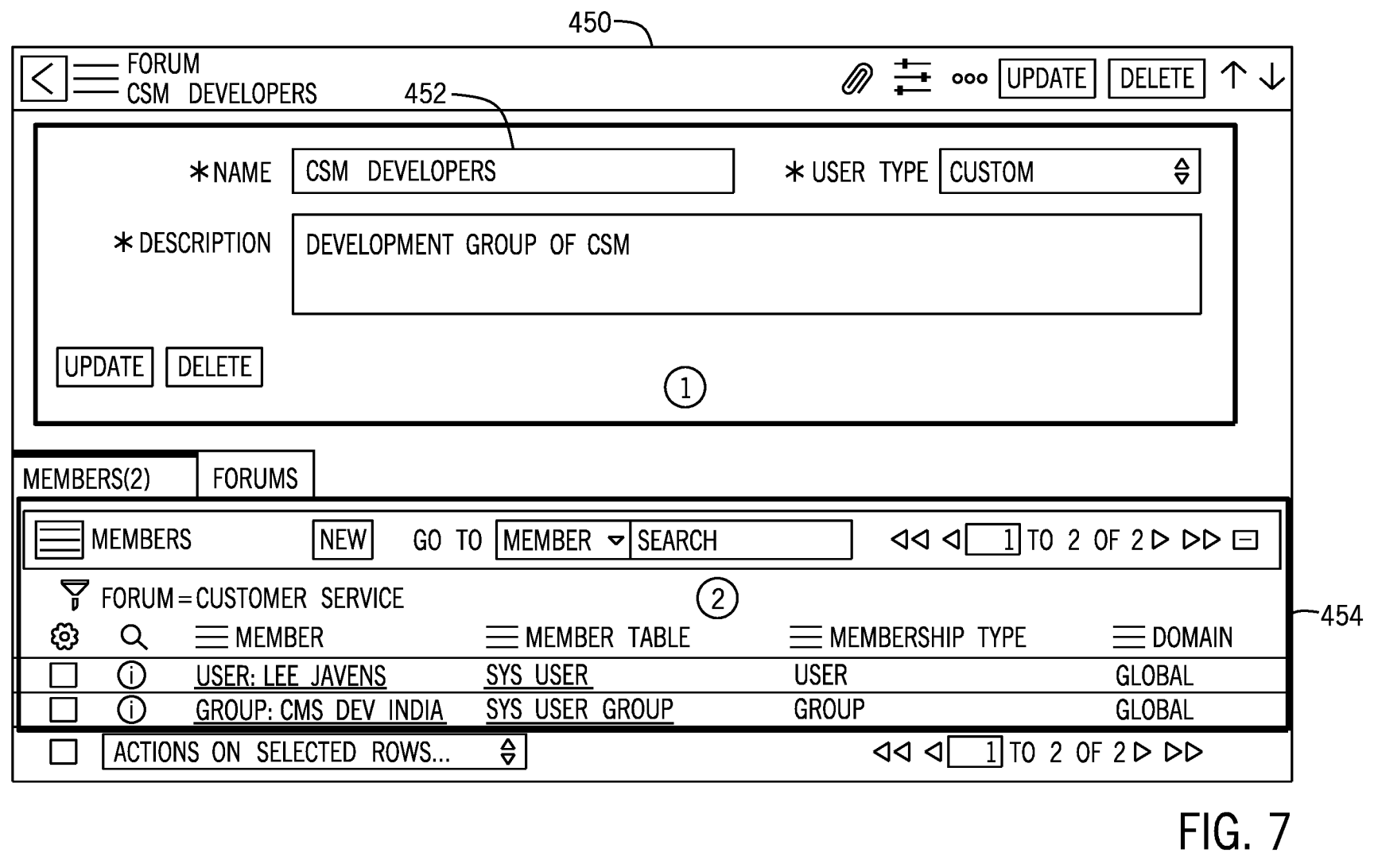

FIG. 7 is an embodiment of a screen 450 that allows the operator to designate forum user groups. As shown, users may be added to forum user groups individually, or in groups. As listed in the name field 452, the instant example is for designating users for the CSM Developers group 302 shown in FIG. 4. New users being added to the CSM Developers group 302 are shown in window 454. A user, here Lee Javens, is being added to the group as a single user. Additionally, a group of users, called "CSM Dev India" is being added to the CSM Developers group 302 as a group. As may be appreciated, adding users in groups may reduce the time required to set up the forums, as each user does not have to be added individually.

FIG. 8 is an embodiment of a screen 500 that allows the operator to designate permissions for a group by content type by setting up a set of content type permissions. As shown in the name field 502, the operator has named this set of content permissions "Question, Answer Write—Video View" indicating that users having this set of content permissions can read and write questions, read and write answers, and view videos. However, the text entered by the operator may be arbitrary, such that the name of the set of content permissions may not be descriptive. When the operator selects the Content Type Access tab 506, the permissions for various content types are displayed in window 508. As listed in the window 506, for videos, the permission is set to "content read", indicating that a user can view videos, but not post videos. For questions and answers, the permissions are set to "content write", indicating that a user can read and post questions and answers.

Figure 9:
FIG. 9 is a screen for displaying the content type permissions assigned to different groups of users of the forum, in accordance with an embodiment.

FIG. 9 is an embodiment of a screen 550 that displays the set of content type permissions assigned to different groups of users of a forum. As shown in the name and description fields 352, 254, the instant embodiment is for the customer service forum shown and discussed in FIGS. 4-6. When a forum permissions tab 552 is selected, the various user groups with access to the forum are shown in window 554, as well as the permission sets assigned to each group. As previously discussed, the CSM Managers group and the CSM developers groups have access to the Customer Service forum. The CSM Managers group has been assigned the "Question, Answer Write—Video View" set of permissions described with regard to FIG. 8 that allows users of the group to read and write questions and answers, as well as view videos. As shown, the CSM Developers group has been assigned a set of permissions called "Question, Answer and Blog View", which allows the group to read, but not post questions, answers, and blogs. The "Question, Answer and Blog View" set of permissions may be created by the operator in a similar fashion as the "Question, Answer Write—Video View" set of permissions described with regard to FIG. 8.

In some embodiments, the operator may wish to grant permission exceptions to specific users outside of the groups to which they may belong. For example, the operator may wish to designate a user as a forum moderator and grant that user special permissions. The operator may accomplish this by selecting the "Permission Exceptions" tab 556. FIG. 10 is an embodiment of a screen 600 that allows permission exceptions to be granted to users or groups of users. As shown in window 602, a set of forum permissions called "forum moderator" has been assigned to a single user, here "Billie Cowley". Though the user may belong to one or more groups of forum users (e.g., CSM Developers and/or CSM Moderators), as a forum moderator, the user may be assigned one or more permissions (e.g., the set of permissions called "Forum Moderator") that override the permissions assigned to the groups to which he belongs. Thus, when permissions are being determined, permission exceptions granted to a user may change one or more of the content type permissions of a user from those of the one or more groups to which the user belongs.

In order to ease the process of setting up Community pages for an organization, the system allows for permission sets to be bulk copied between forums, groups of users, or individual users. For example, FIG. 11 is an embodiment of a screen 650 that allows the operator to bulk copy permissions from one forum to one or more other forums. In a first window 652, the operator designates which forum the operator would like to copy permissions from. The operator may select the source forum from a list, type the name of the source forum (e.g., with or without the system auto-completing the name), or select the source forum in some other way. Window 654 lists the forums to which the permissions of the source forum may be copied. In the illustrated embodiment, the operator may select one or more forums from the forums listed. The permissions of the source forum will then be copied to the selected forums. In other embodiments, the operator may type in some or all of the target forums, or drag and drop the desired target forums into the window 654.

Figure 12:
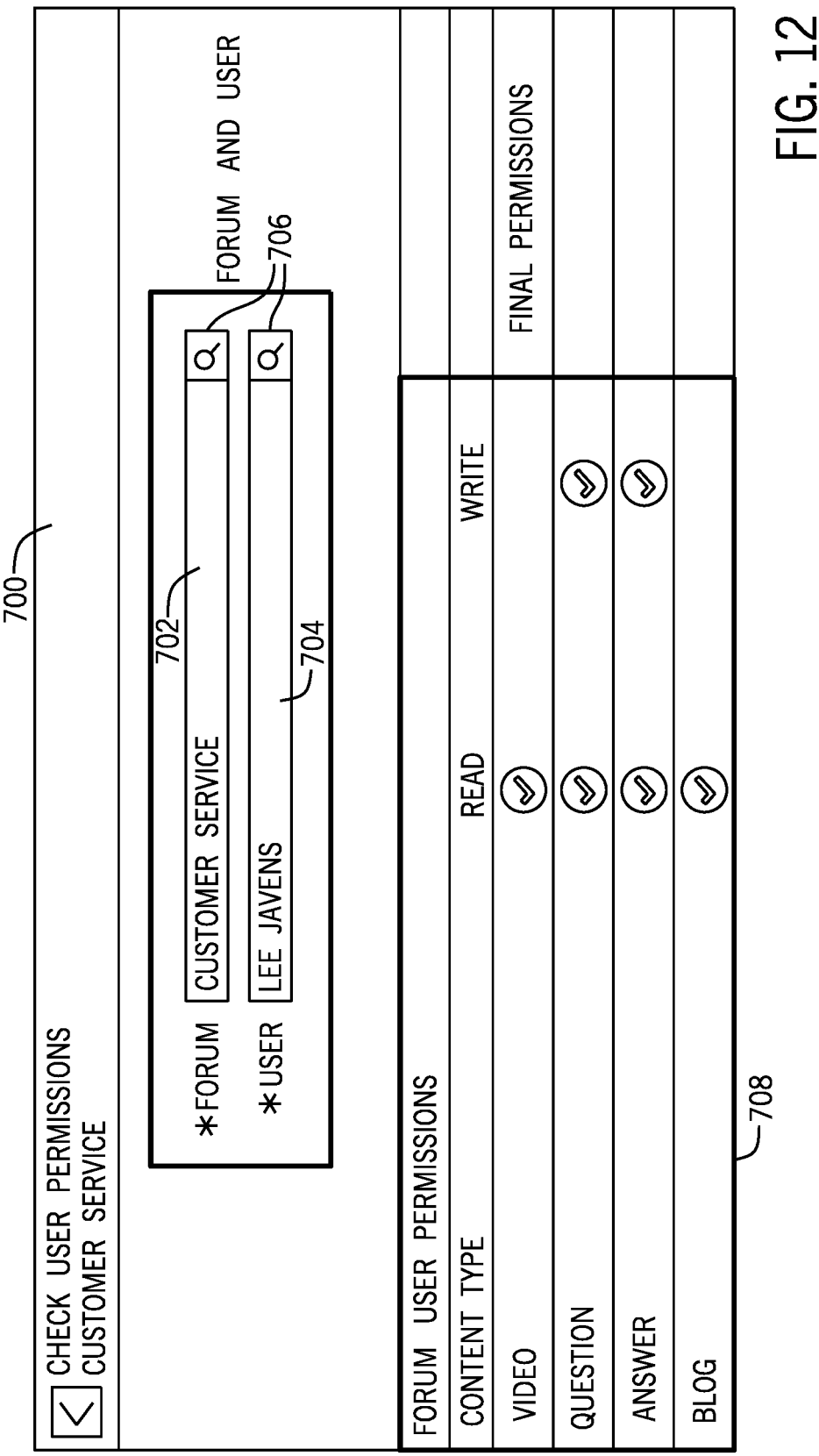
FIG. 12 is a debug screen used by a user to check the permissions for forum users, in accordance with an embodiment.

FIG. 12 is an embodiment of a debug screen used by a forum administrator to double check the permissions for a forum user. For example, a forum and a forum user may be selected and the permissions for various content types may be determined and displayed, taking into account the one or groups to which the user may belong and the permission exceptions that may be assigned to the forum user. As shown, the operator enters the forum name (e.g., "customer service") in the forum field 702 and the forum user name (e.g., "Lee Javens") in the user field 704. The user may type all or part of the desired text into the fields 702, 704, or characters sufficiently similar to the desired text as to be algorithmically matched, and then interact with the search buttons 706 to search for the correct text. The final permissions for the selected user in the selected forum may then be displayed in the window 708. For example, in the instant embodiment, the user has permission to view videos, questions, answers, and blogs, but can only post questions and answers.

It should be understood that the interface screen shots shown in FIGS. 5-12 are merely examples and that actual implementations of the disclosed techniques may vary. Accordingly, the user names, forum names, user group names, content types, permission types, display layouts, methods of communicating inputs and/or selections, etc. may vary from application to application.

Figure 13:
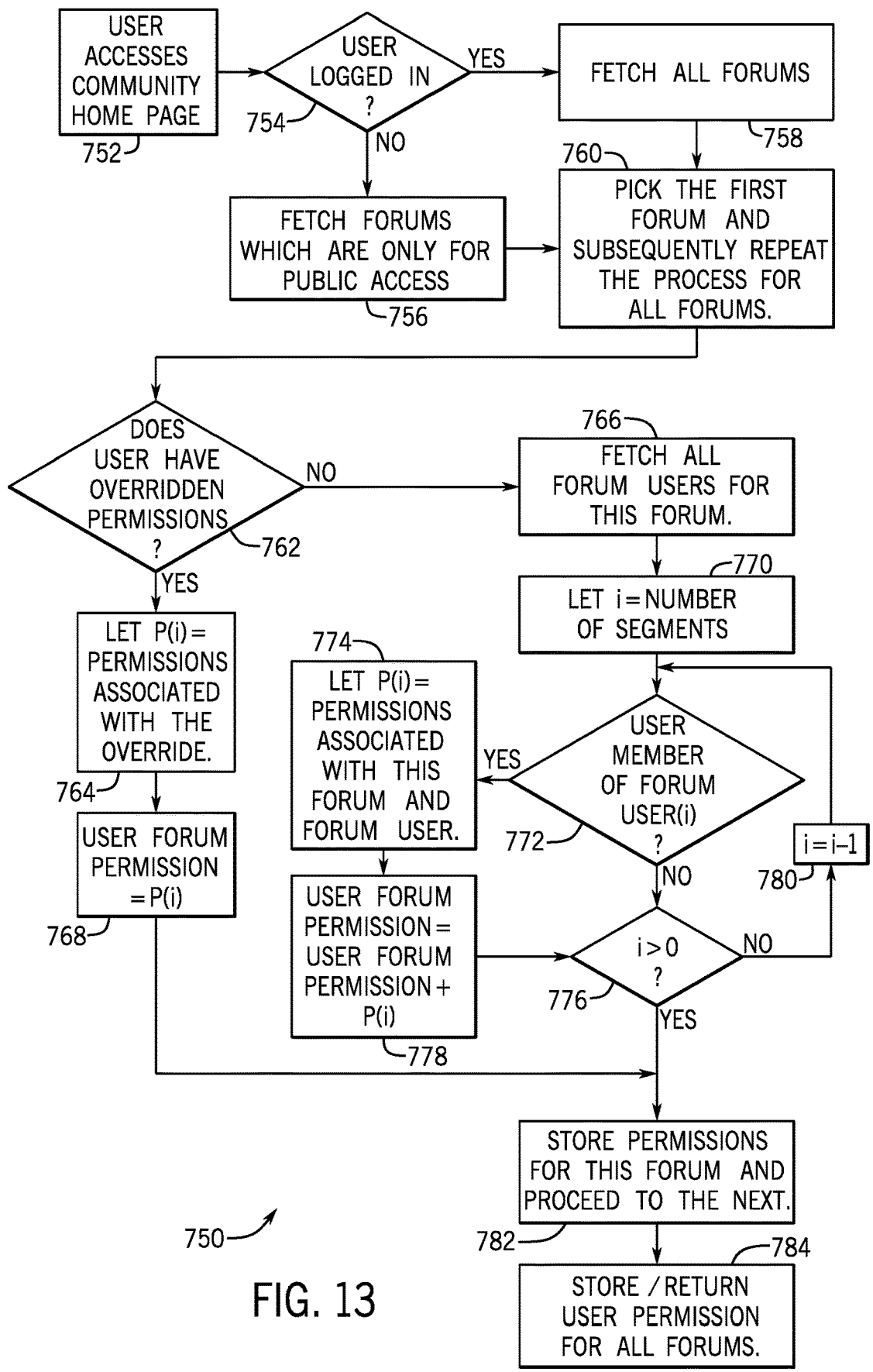
FIG. 13 is a flow chart of a process for determining the permissions of a given forum user, in accordance with an embodiment.

FIG. 13 is a flow chart of a process 750 for determining the permissions of a forum user. In block 752, the user accesses the Community home page. The user may access the Community home page via a desktop computer, a notebook computer, a tablet, a mobile phone, or some other computing device. The Community home page may be accessed using a web browser of one of the aforementioned devices, or an application.

At decision 754, the system determines whether or not the user is logged in (e.g., using a username and password). If the user is not logged in, the system proceeds to block 756 and fetches publicly accessible forums (block 756). If the user is logged in, the system fetches all forums (block 758). In block 760, the system is instructed to select the first forum from the list of forums fetched via blocks 758 or 756 for processing. It is also instructed to repeat the process for all the forums. At decision 762, the system determines whether there are overridden permissions (e.g., permission exceptions) for the current user. If the user has overridden permissions, then the user's permissions are determined to be the permissions associated with the override (block 768). If the user does not have any overridden permission, the system proceeds to fetch all the forum users for this forum. In block 770, the system sets the value for the letter i as equal to the number of segments (e.g., the number of fetched forum users). In decision 772, the systems determines whether the user is a member of the $i^{th}$ forum user fetched. If the user is not a member of the forum user entity for the forum in question, the system determines whether i is greater than zero (decision 776). That is, the system determines whether there are still forum user entities under this forum to determine permissions for. If not, the system stores temporarily the determined user permissions for the forum in question (block 782). If i is greater than zero, then the value of i is reduced by one and run for a new forum user (block 780). If the user is part of one or more forum users, at decision 772, the system determines the user's permissions to be that of the forum user for the forum in question (block 774). The forum user's permissions for the forum in question are then added to the forum user's collective permissions (block 778). The system then determines whether there are more forum permission determinations to be made (i.e., is i greater than zero?) at decision 776. The system then cycles through until permissions for all fetched forums have been determined as stated in block 784.

As previously discussed, some users may have permission to post certain content types. For some content, such as videos, pictures, webpage links, etc., a user may provide a link to content the user would like to post. The Community pages may include a rendering widget to render various types of content from various sources. For example, a user may provide a link to a video from online or cached sources. The rendering widget can accommodate a variety of different formats and a variety of different encoding standards to render the video and display the video within the Community pages. The rendering widget may include one or more tables. For example, the rendering widget may include a database table to store mapping between domains and the rendering widget. A parent widget may call up the associated rending widget for each source or format based upon the domain of the link provided by the user. The appropriate rending widget then renders the video and embeds it in the desired location of the Community pages.

Figure 14:
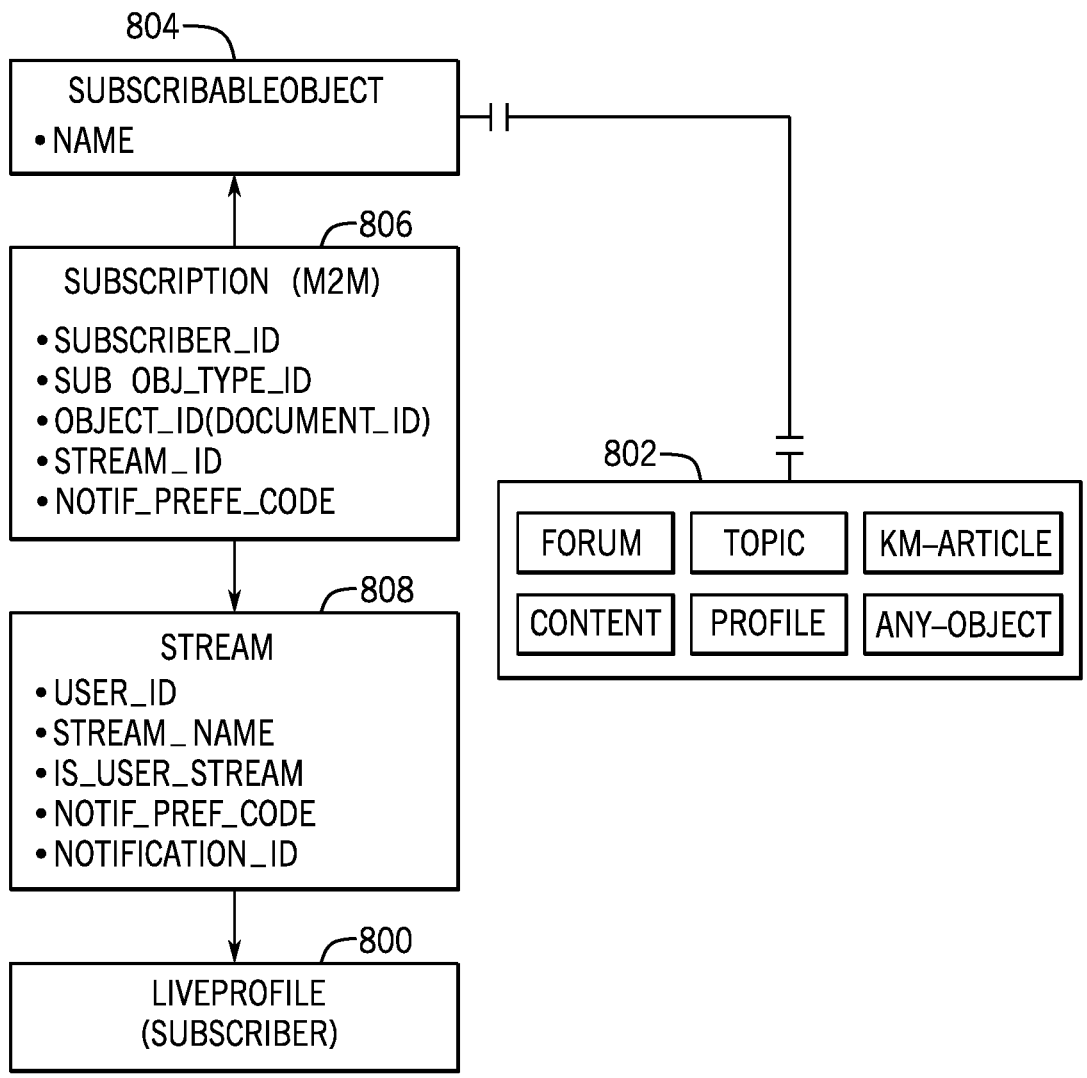
FIG. 14 is a schematic of a subscription architecture of the Community pages, in accordance with an embodiment.

In addition to setting permissions which content types a user can see and post, the Community pages also allow users to subscribe to objects (e.g., forums, topics, articles, content, profiles, pages, or other objects) within the Community pages. Based on a user's subscriptions an activity stream may be populated for the user's viewing when the user logs in next. The user may also configure their subscription notification settings to generate emails, SMS messages, push notifications, etc. when a subscribed to object changes or updates. FIG. 14 illustrates the core subscriptions architecture of one implementation of Community pages. As shown, a user (e.g., subscriber 800) subscribes to one or more of a collection of objects 802, resulting in the object being listed in a subscribed object table 804. A subscription table 806 then tracks changes or updates to the objects referenced in the subscribed object table 804 and populates a stream table 808 with the updates or changes to the one or more subscribed objects in the subscribed objects table 804. An activity stream may then be populated using the stream table 808 and provided to the subscriber 800 in a variety of ways (e.g., activity stream within the Community pages, emails, SMS messages, push notifications, etc.).

Figure 15:
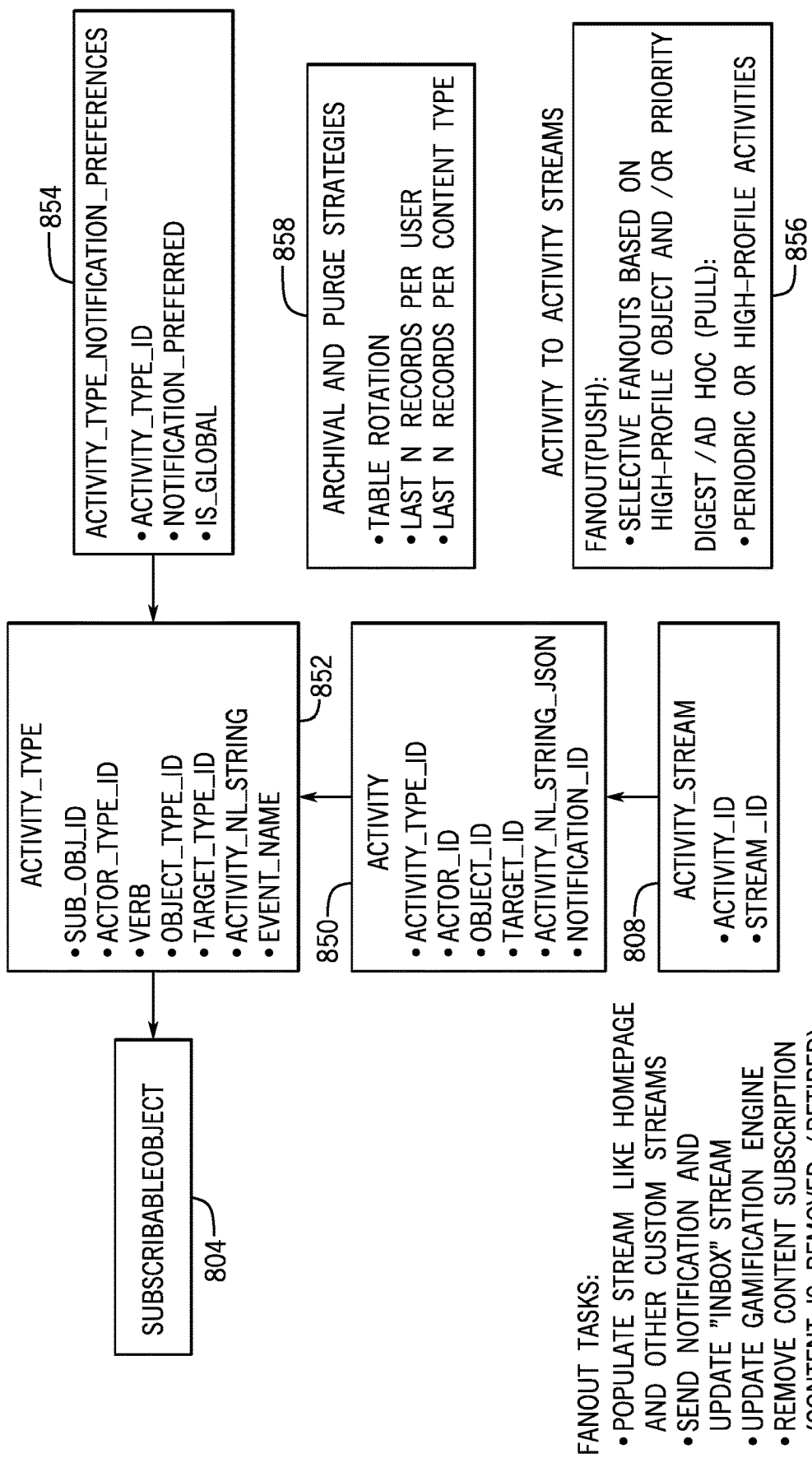
FIG. 15 is a schematic of a subscription architecture for multiple different activity types within the Community pages, in accordance with an embodiment.

FIG. 15 is a schematic of one embodiment of a subscription architecture for multiple different activity types. As shown, an activities table 850 is populated with activities (e.g., updates, changes, new content, etc.) of the subscribed objects in the subscribed objects table 804 and may be categorized according to an activity types table 852, which may be defined by various dimensions of an activity, such as an actor type, an object type, and/or a target type. The user may utilize activity type notification preferences, stored in an activity type notification preferences table 854 (e.g., in bit map preference code) to control how they are notified of activities in the activities table 850 based on activity types in the activity types table 852. Based on the activity type notification preferences of a user, the activity stream table 808 may be populated with various activities from the activities table 850. As shown in window 856, population of the activity stream table 808 may be based on a push (e.g., fanout) and/or pull (e.g., digest) scheme. For example, in a push scheme, changes in objects in the subscribed objects table 804 causes the changes to be sent to the activity stream table 808. Accordingly, high profile or high priority activities may generate a notification (e.g., email, SMS message, push notification) that is provided to the user. In a pull scheme, the activity stream table 808 is updated periodically or when some event occurs (use login). In a pull scheme, activity notifications are collected periodically or on a schedule and may be provided to the user (e.g., via a daily digest email or an activity when the user logs in). As shown in window 858, a number of strategies may be applied to archive and purge old activities. For example, the system may apply table rotation, only display the last N number of records per user, or the last N number of records per content type.

Figure 16:
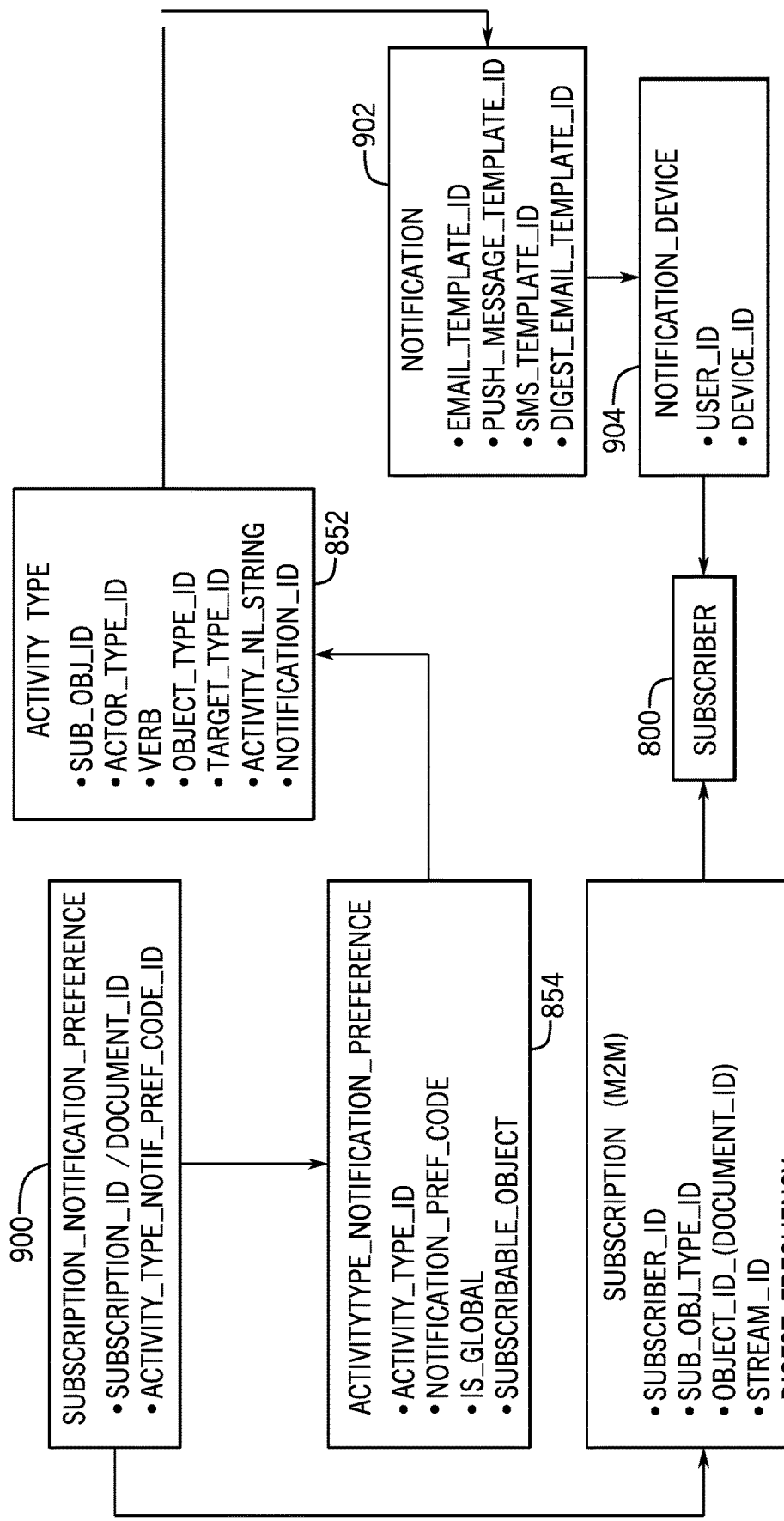
FIG. 16 is a schematic of a notifications architecture for managing notifications within the Community pages, in accordance with an embodiment.

FIG. 16 is a schematic of one embodiment of a notifications architecture for managing notifications. As illustrated and previously discussed, the subscriber manages their subscriptions, stored in the subscriptions table 806, as well as their activity type notification preferences, stored in an activity type notification preferences table 854, and their subscription notification preferences, stored in a subscription notification preferences 900. When a subscribed object generates an activity, the system classifies the activity by type and references the activity type notification preferences table 854 and the subscription notification preferences table 900. If the system determines that the subscriber should be notified of the activity, a notification (e.g., email, push notification, SMS message, etc.) is generated 902 and sent to a notification device 904 (e.g., computer, tablet, mobile phone, wearable, etc.) for the subscriber 800 to view.

Figure 17:
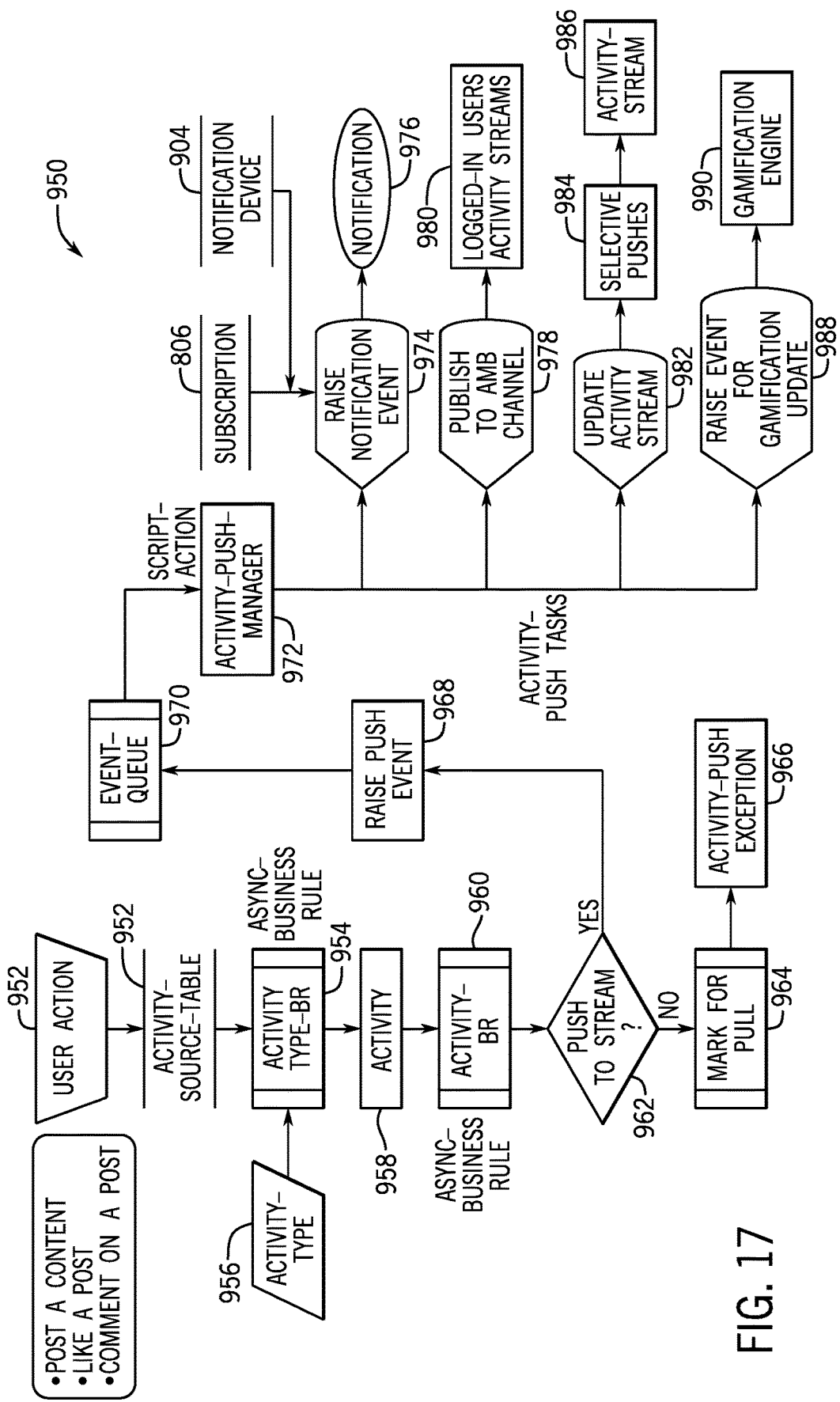
FIG. 17 is a flow chart of an embodiment of a process for managing subscriber notifications regarding activity within the Community pages, in accordance with an embodiment.

FIG. 17 is a flow chart of an embodiment of a process 950 for managing subscriber notifications. In block 952, a user takes an action (e.g., posts content, likes a post, comments on a post, etc.) that generates an activity. In block 952, an entry is added to the activity source table. In block 954, the activity is assigned an activity type from one of the available defined activity types 956. In blocks 958 and 960, the activity is defined. At decision 962, the system determines whether or not the activity should be pushed to stream. If not, the activity is marked for pull (block 964) and an activity push exception is made (block 966). If the activity should be pushed to stream, a push event is raised (block 968) and added to the event queue (block 970).

Based on the various preferences input by the subscriber (e.g., subscription preferences, activity type notification preferences, subscription notification preferences, etc.), the activity push manager determines what to do with the push event (block 972). For example, the activity push manager may raise a notification event (block 974) and generate a notification provided to the user via email, SMS message, or push notification. The activity push manager may also publish the activity to an AMB channel (block 978), which is displayed in the activity feeds of logged in subscribers (block 980). The activity push manager may also update the activity stream of the subscriber (block 982) with selective pushes (block 984). The subscriber may then see the activity as part of the activity stream (block 986) when they log in. Finally, the activity push manager may raise the event for a gamification update (block 988) and add the activity to the gamification engine (block 990).

In addition to managing subscriptions, the system may also assist users in managing profiles for a more unified profile experience. For example, a user may have multiple different personas. For example, a user may be an employee of one organization, a customer of a second organization, and an advisor to a third organization. The user may wish to display different information in his profile for each persona. Rather than create a different profile for each persona, or having to make decisions about what information to display in a single persona, the system allows users to keep all of their profile information in a single place, but display or not display information in accordance with the various personas as desired. For example, when a second user requests to see the user's profile, the system may algorithmically make a determination as to how the second user might know the first user (e.g., which persona), and then display information corresponding to the matched persona. The matching determination may be based on various factors, including, but not limited to, organization or groups in common, job title, managerial or supervisory duties, office locations, and so forth. The user may also designate what information should and should not be displayed (e.g., a public profile) when there is no apparent connection between the two users.

The disclosed techniques generally relate to keeping track of and implementing user permissions and user subscriptions with regard to content posted on one or more peer-to-peer knowledge sharing platforms (e.g., Community pages). Specifically, by assigning permissions to groups of users, rather than individual users, and then keeping track of which users belong to what groups, setting up and maintaining user permissions for various content types is easier, and requires less memory and less processing power. If a user belongs to multiple groups, permissions may be determined by ranking the groups and giving the user in question the permissions of one group based on the ranking, or by grating the user the most restrictive or least restrictive permissions, either for all content types, or by individual content types. Further, within the Community pages, users may subscribe to forums, topics, user profiles, pages, specific content, or any other object. Users may then define preferences for how they would like to be notified of activity. Based on the notification preferences, the user may be notified of activity via an activity stream when they log into the Community pages, via email, via SMS message, via push notification, or some other way.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:

non-transitory memory; and one or more hardware processors configured to read instructions from the non-transitory memory to perform operations comprising:

receiving a command from a first user to subscribe to a community forum of a peer-to-peer knowledge sharing platform, wherein the community forum allows a plurality of users of a software resource to exchange information regarding implementation of the software resource;

receiving one or more community forum notification preferences from the first user defining a first type of community forum notification the first user would prefer to receive in response to a first type of content being posted in the community forum to which the first user is subscribed;

receiving an indication of content being posted in the community forum to which the first user is subscribed;

storing a first entry indicative of the content in an activity table;

determining that the content being posted in the community forum to which the first user is subscribed is of the first type of content;

categorizing the content as being of the first type of content or a second type of content different from the first type of content;

determining, based on the one or more community forum notification preferences and the content being categorized as being of the first type of content, that a notification of the first type of community forum notification will be generated;

generating and sending the notification notifying the first user of the content being posted in the community forum to which the first user is subscribed, wherein the notification is of the first type of community forum notification;

adding the first entry to a stream table from the activity table in response to determining that the content being posted in the community forum to which the first user is subscribed is categorized as being of the first type of content, wherein the stream table is different from the activity table; and populating and displaying an activity feed with the content being posted in the community forum to which the first user is subscribed, based on the one or more community forum notification preferences and the stream table, wherein the activity feed includes the content.

2. The system of claim 1, wherein the activity feed is populated by an activity stream table.

3. The system of claim 1, wherein the activity feed is populated in a push scheme.

4. The system of claim 1, wherein the activity feed is populated in a pull scheme.

5. The system of claim 1, wherein generating and sending the notification comprises propagating entries in an activity feed table, wherein one or more old entries in the activity feed table are removed based on a maximum number or records per user or a maximum number of records per content type.

6. The system of claim 1, wherein the notification is generated in a push scheme.

7. The system of claim 1, wherein the notification comprises an email, an SMS message, or a push notification, or a combination thereof.

8. A method for notifying a user, the method comprising:
receiving a command from a first user to subscribe to a community forum of a peer-to-peer knowledge sharing platform, wherein the community forum allows a plurality of users of a software resource to exchange information regarding implementation of the software resource;

receiving one or more community forum notification preferences from the first user defining a first type of community forum notification the first user would prefer to receive in response to a first type of content being posted in the community forum to which the first user is subscribed;

receiving an indication of content being posted in the community forum to which the first user is subscribed;

storing a first entry indicative of the content in an activity table;

determining that the content being posted in the community forum to which the first user is subscribed is of the first type of content;

categorizing the content as being of the first type of content or a second type of content different from the first type of content;

determining, based on the one or more community forum notification preferences and the content being categorized as being of the first type of content, that a notification of the first type of community forum notification will be generated;

generating and sending the notification notifying the first user of the content being posted in the community forum to which the first user is subscribed, wherein the notification is of the first type of community forum notification;

adding the first entry to a stream table from the activity table in response to determining that the content being posted in the community forum to which the first user is subscribed is categorized as being of the first type of content, wherein the stream table is different from the activity table; and populating and displaying an activity feed with the content being posted in the community forum to which the first user is subscribed, based on the one or more community forum notification preferences and the stream table, wherein the activity feed includes the content.

9. The method of claim 8, wherein the activity feed is populated in a pull scheme, a push scheme, or both.

10. The method of claim 8, wherein generating and sending the notification comprises propagating entries in an activity feed table, wherein one or more old entries in the activity feed table are removed based on a maximum number or records per user or a maximum number of records per content type.

11. The method of claim 8, wherein the notification comprises an email, an SMS message, or a push notification, or a combination thereof.

12. A non-transitory computer readable medium comprising computer readable code, that when executed by one or more processors, causes the one or more processors to perform operations comprising:

receiving a command from a first user to subscribe to a community forum of a peer-to-peer knowledge sharing platform, wherein the community forum allows a plurality of users of a software resource to exchange information regarding implementation of the software resource;

receiving one or more community forum notification preferences from the first user defining a first type of community forum notification the first user would prefer to receive in response to a first type of content being posted in the community forum to which the first user is subscribed;

receiving an indication of content being posted in the community forum to which the first user is subscribed;

storing a first entry indicative of the content in an activity table;

determining that the content being posted in the community forum to which the first user is subscribed is of the first type of content;

categorizing the content as being of the first type of content or a second type of content different from the first type of content;

determining, based on the one or more community forum notification preferences and the content being categorized as being of the first type of content, that a notification of the first type of community forum notification will be generated;

generating and sending the notification notifying the first user of the content being posted in the community forum to which the first user is subscribed, wherein the notification is of the first type of community forum notification;

adding the first entry to a stream table from the activity table in response to determining that the content being posted in the community forum to which the first user is subscribed is categorized as being of the first type of content, wherein the stream table is different from the activity table; and populating and displaying an activity feed with the content being posted in the community forum to which the first user is subscribed, based on the one or more community forum notification preferences and the stream table, wherein the activity feed includes the content.

13. The non-transitory computer readable medium of claim 12, wherein the activity feed is populated in a pull scheme, a push scheme, or both.

14. The non-transitory computer readable medium of claim 12, wherein generating and sending the notification comprises propagating entries in an activity feed table, wherein one or more old entries in the activity feed table are removed based on a maximum number or records per user or a maximum number of records per content type.

15. The non-transitory computer readable medium of claim 12, wherein the notification is generated in a push scheme.

16. The system of claim 1, wherein the operations comprise: determining that the content satisfies a push event criterion defined based on the one or more community forum notification preferences.

17. The system of claim 1, wherein the operations comprise:
   determining that the first user is logged into the community forum; and
   displaying the notification within the community forum.

18. The system of claim 1, wherein the operations comprise:
   storing a second respective entry indicative of each of the one or more community forum notification preferences; and
   updating an activity stream table based on the first entry and the second respective entry, wherein the activity feed is generated and populated based on the activity stream table.

* * * * *